(12) United States Patent
Fan et al.

(10) Patent No.: US 9,396,553 B2
(45) Date of Patent: Jul. 19, 2016

(54) VEHICLE DIMENSION ESTIMATION FROM VEHICLE IMAGES

(71) Applicant: Xerox Corporation, Norwalk, CT (US)

(72) Inventors: Zhigang Fan, Webster, NY (US); Hao Wu, Pittsford, NY (US); Yao Rong Wang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 72 days.

(21) Appl. No.: 14/254,360

(22) Filed: Apr. 16, 2014

(65) Prior Publication Data

US 2015/0302611 A1    Oct. 22, 2015

(51) Int. Cl.
*G06K 9/00* (2006.01)
*G06T 7/60* (2006.01)
*G06T 7/00* (2006.01)
*G06K 9/52* (2006.01)

(52) U.S. Cl.
CPC ............ *G06T 7/602* (2013.01); *G06K 9/00791* (2013.01); *G06K 9/52* (2013.01); *G06T 7/0083* (2013.01); *G06T 7/0097* (2013.01); *G06T 2207/10016* (2013.01); *G06T 2207/20021* (2013.01); *G06T 2207/30248* (2013.01); *G06T 2210/12* (2013.01)

(58) Field of Classification Search
None
See application file for complete search history.

(56) References Cited

U.S. PATENT DOCUMENTS

| 2012/0070034 A1* | 3/2012 | Xiao ................... G06K 9/00624 |
| | | 382/103 |
| 2013/0058528 A1* | 3/2013 | Liu ..................... G06K 9/00798 |
| | | 382/103 |
| 2013/0294643 A1 | 11/2013 | Fan et al. |
| 2014/0159925 A1* | 6/2014 | Mimeault ............... G01S 17/58 |
| | | 340/935 |
| 2014/0195138 A1* | 7/2014 | Stelzig .................. G08G 1/0116 |
| | | 701/119 |

FOREIGN PATENT DOCUMENTS

| GB | 2342800 A | 4/2000 |
| WO | 2007048796 A1 | 5/2007 |

* cited by examiner

*Primary Examiner* — Weiwen Yang
(74) *Attorney, Agent, or Firm* — Fox Rothschild LLP

(57) ABSTRACT

A method and system for determining one or more dimension estimations for a vehicle. A sequence of image frames of a vehicle is received, and a digital representation of the vehicle is extracted from each image in the sequence of image frames. A bounding box is determined for the vehicle based upon the extracted digital representation for each digital representation of the vehicle and at least one dimension of the vehicle is estimated based upon the determined bounding box. An indication of the at least one estimated dimension is output. The indication of at least one estimated dimension is transferred as an input to a comparison technique for further processing the indication of the at least one estimated dimension. The comparison technique can include a parking determination process configured to determine a recommended spot for the vehicle based upon the indication of the at least one estimated dimension.

25 Claims, 4 Drawing Sheets

VEHICLE DIMENSION ESTIMATION FROM VEHICLE IMAGES

BACKGROUND

The present disclosure relates to estimating vehicle dimensions. More specifically, the present disclosure relates to estimating vehicle dimension information from a photo or video feed.

In transportation applications, it is often required to estimate information related to a vehicle based upon an image or a video feed related to the vehicle. For example, tunnel control systems often measure the height of incoming vehicles to determine whether a vehicle is too tall for a specific tunnel. However, these systems typically use a stationary sensor positioned at a specific height. Thus, when an object passes in front of the sensor, the sensor can quickly determine that the object is oversized and therefore is not permitted to use the tunnel. In another example, vehicle dimension information can be used for parking applications where the dimension information can be used to guide a driver to a parking space that is suitably sized for the vehicle.

Similar identification systems are used for toll systems where the license plate of a vehicle is imaged and the license plate number is extracted or otherwise read from the image for verification or billing purposes. Additionally, systems are used at toll booths to determine the weight of a vehicle and the number of axles the vehicle has, each of which can impact tolls. However, none of the existing measurement systems accurately determine the overall size dimensions of a moving vehicle.

SUMMARY

In one general respect, the embodiments disclose a method of determining one or more dimension estimations for a vehicle. The method may include receiving a sequence of image frames of a vehicle, extracting a digital representation of the vehicle from each image in the sequence of image frames, determining a bounding box for the vehicle based upon the extracted digital representation for each digital representation of the vehicle, estimating at least one dimension for the vehicle based upon the determined bounding box, and outputting an indication of the at least one estimated dimension.

In the method, outputting the indication may include transferring the indication of the at least one estimated dimension as an input to a comparison technique for further processing the indication of the at least one estimated dimension. For example, the comparison technique can include a parking determination process configured to determine a recommended spot for the vehicle based upon the indication of the at least one estimated dimension. Additionally, extracting the digital representation of the vehicle can include performing at least one of example background subtraction, particle filtering, and a shadow removal algorithm.

Similarly, in the method, determining the bounding box can include identifying a line associated with a point where the vehicle contacts a supporting surface by determining two or more points where each tire of a near side of the vehicle contacts the supporting surface and drawing a line that includes a segment that extends between each of the points. Alternatively or additionally, determining the bounding box can further include identifying a far right point of the digital representation of the vehicle and a far left point of the digital representation of the vehicle.

Additionally, in the method as described above, estimating at least one dimension of the vehicle can include estimating a length and width of the vehicle based upon a bottom edge of the boundary box as well as estimating a height of the vehicle based upon a distance measured between a rear vertex of the bounding box and an upper vertex of the bounding box.

In another general respect, the embodiments disclose a system for determining one or more dimension estimations for a vehicle. The system may include a processor configured to perform various functions and operations and a non-transitory computer readable medium in communication with the processor. The computer readable medium may include one or more programming instructions for causing the processor to receive a sequence of image frames of a vehicle, extract a digital representation of the vehicle from each image in the sequence of image frames, determine a bounding box for the vehicle based upon the extracted digital representation for each digital representation of the vehicle, estimate at least one dimension for the vehicle based upon the determined bounding box, and output an indication of the at least one estimated dimension.

In another general respect, the embodiments disclose a method of determining one or more dimension estimations for a vehicle. The method may include receiving a sequence of image frames of a vehicle, extracting a plurality of digital representations of the vehicle from each image in the sequence of image frames, wherein each of the digital representations is associated with one image frame, determining a bounding box in each of the plurality of digital representations for the vehicle, estimating at least one dimension for the vehicle based upon the determined bounding box, and outputting an indication of the at least one estimated dimension. In the method, determining the bounding box includes identifying a first line associated with a point where the vehicle contacts a supporting surface, identifying a second line based upon an identified far right point of the vehicle as determined from the extracted plurality of digital representations, wherein the second line is drawn perpendicular to the supporting surface and includes the far right point, identifying a third line based upon an identified far left point of the vehicle as determined from the extracted plurality of digital representations, wherein the third line is drawn perpendicular to the supporting surface and includes the far left point, and identifying a fourth line connecting the second line and the third line and draw essentially parallel to a top surface of the vehicle.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, a "computing device" refers to a device that processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment. A computing device may interpret and execute instructions.

The present disclosure is related to methods and systems for estimating vehicle dimensions from images containing the vehicle. It should be noted that, while vehicle dimensions could be determined from one single image, it is not always reliable. Thus, in the present disclosure, a robust systems and methods are presented to estimate the dimension of a moving vehicle from a video sequence.

The proposed techniques as described herein estimate the vehicle dimension using multiple frames in a video sequence of length N (N>1). The present disclosure exploits the changes of the viewing angle to the vehicle in different frames according to, for example, the process as shown in FIG. 1.

Figure 1:
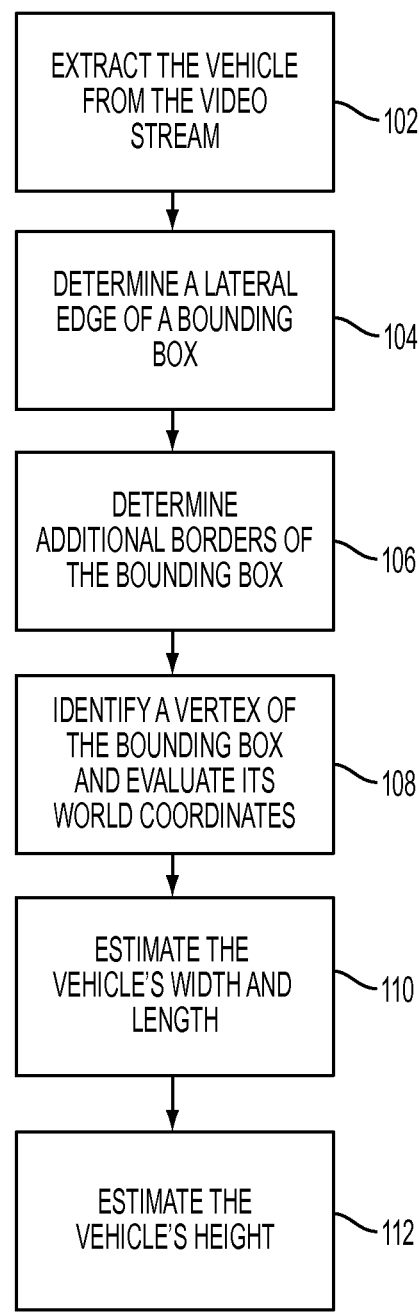
FIG. 1 depicts a process for determining one or more vehicle dimensions according to an embodiment.

FIG. 1 depicts a sample process for extracting information related to one or more dimensions of a vehicle and estimating those one or more dimensions. For example, an estimation system, such as a remote computing device operably connected to or integral with one or more image capturing devices positioned and configured to obtain vehicle images, may extract 102 the vehicle object from multiple vehicle images. A series of still images may be extracted from a sequence of images, such as frames of a video stream. Each of the images may include a particular vehicle as it moves through a physical location that is associated with the frame.

The estimation system may use any suitable image processing method, system or techniques, such as edge detection methods or systems, methods or systems for background subtraction, particle filtering, and other similar detection and tracking methods and systems, possibly used together with a shadow removal algorithm to accurately determine and identify the outer edges of the vehicle as identified in the images.

Depending upon the programming and implementation of the estimation system, the estimation system may make various assumptions when initially processing the images. For example, the estimation system may assume that variable x represents the direction along which the vehicle is moving, and z points up perpendicular to a surface upon which the vehicle is travelling, with z=0 representing the ground level, i.e., the height at which the vehicle contacts the surface. The estimation system may establish these variables by recognizing that variable x represents an axis that is along a line a, which may represent the longest dimension of the vehicle, and also by examining multiple image frames in the video sequence to identify that the vehicle is moving along axis x (which corresponds to, in this example, line a). This estimation will be described in greater detail below.

Figure 2:
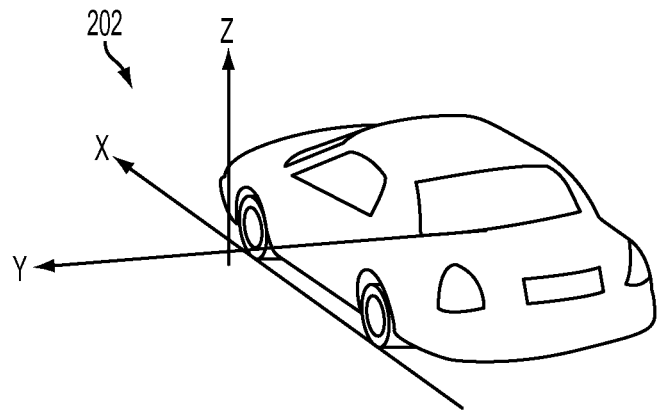
FIGS. 2-5 depict a set of vehicle images including one or more added features for determining one or more vehicle dimensions according to an embodiment.

The estimation system may further assume that $\partial U/\partial z \approx 0$, where U is the horizontal coordinate of the image. Thus, a line parallel to the z-axis in a coordinate system associated with the images as shown in FIG. 2 maps to a vertical line in the image.

The estimation system may further assume that the vehicle whose dimensions are being estimated is travelling on a street or other similar surface in a linear trajectory. For example, the camera obtaining the images of the vehicle may have been calibrated with a linear camera model that maps a 3-dimensional world point (x, y, z) to a 2-dimensional image point (U, V). A set of initial equations may include:

$$(u,v,t)=(x,y,z,1)M \quad (1)$$

$$U=u/t \quad (2)$$

and $$V=v/t. \quad (3)$$

where M is a 4×3 matrix specifying the linear model that is known from the calibration. Using equations (1)-(3), the image coordinate of a point may be evaluated if its image-based coordinate is known. Combining equations (1), (2), and (3) may produce:

$$xM(1,1)+yM(2,1)+zM(3,1)+M(4,1)-UxM(1,3)-UyM(2,3)-UzM(3,3)-UM(4,3)=0 \quad (4)$$

and $$xM(1,2)+yM(2,2)+zM(3,2)+M(4,2)-VxM(1,3)-VyM(2,3)-VzM(3,3)-VM(4,3)=0 \quad (5)$$

where M(m, n) is the (m,n)-th element of matrix M. It should be noted, though, that given a known image coordinate, the vehicle's world coordinate cannot be uniquely determined only by equations (4) and (5). However, if one of the values of x, y, and z is known, equations (4) and (5) would have only two unknowns and the estimation system may determine the true world coordinate of a point on the vehicle.

Figure 3:
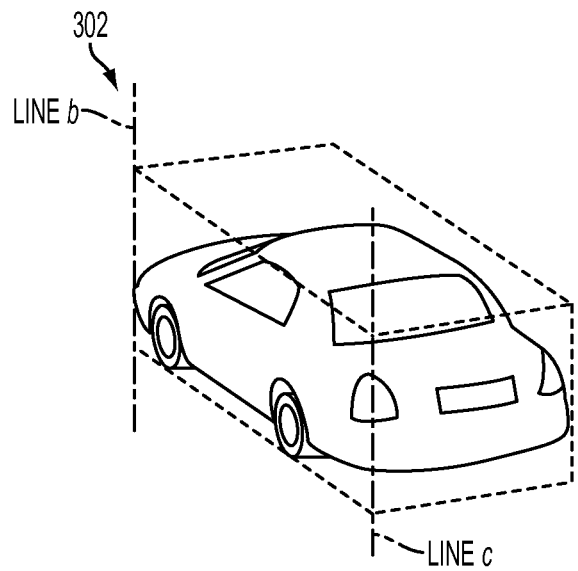

The estimation system may further determine various edges of a vehicle bounding box overlaid on the image of the vehicle. As shown in FIG. 3, still image 302 shows a bounding box of a vehicle. The estimation system may estimate borders of the boundary box such as lines a, b, c, d, and e shown in still image 402 of FIG. 4 using processes such as those described below.

The estimation system may determine 104 a lateral edge of the bounding box, which in this case is the longest bottom edge of the bounding box representing the edge under the vehicle's tires that are visible in the image. This is represented by line a in still image 402 of FIG. 4, and it includes a point where the vehicle touches a supporting surface such as a road or parking surface.

For example, to determine the location and direction of line a, the estimation system may detect the vehicle's tires at the near side using a tire detection algorithm. More specifically, a tire detection algorithm may process the image to analyze contrast ratios at areas where the tires are most likely to be placed (e.g., as determined based upon identification of wheel arches, fenders, or other similar identification features of the vehicle). Based upon the detected position of the tires and where the tires meet the road (or whatever supporting surface the vehicle is sitting on), the system may determine line a for each frame i. For example, as shown in image 402 of FIG. 4, the line a may define one of the bottom edges of a vehicle bounding box that will be used to determine other edges of the vehicle. This estimation of line a may be repeated for two or more images of the vehicle. It should be noted, however, that the above-discussed techniques for tire detection are shown by way of example only, and other tire detection methods may be used.

It should be noted that a vehicle with wheels and tires is shown by way of example only. The dimension estimation techniques as described herein can be applied to additional vehicles that do not include tires, such as boats and treaded vehicles. If so, then the system may use other methods to detect a bottom edge of a box that bounds the vehicle.

Figure 4:
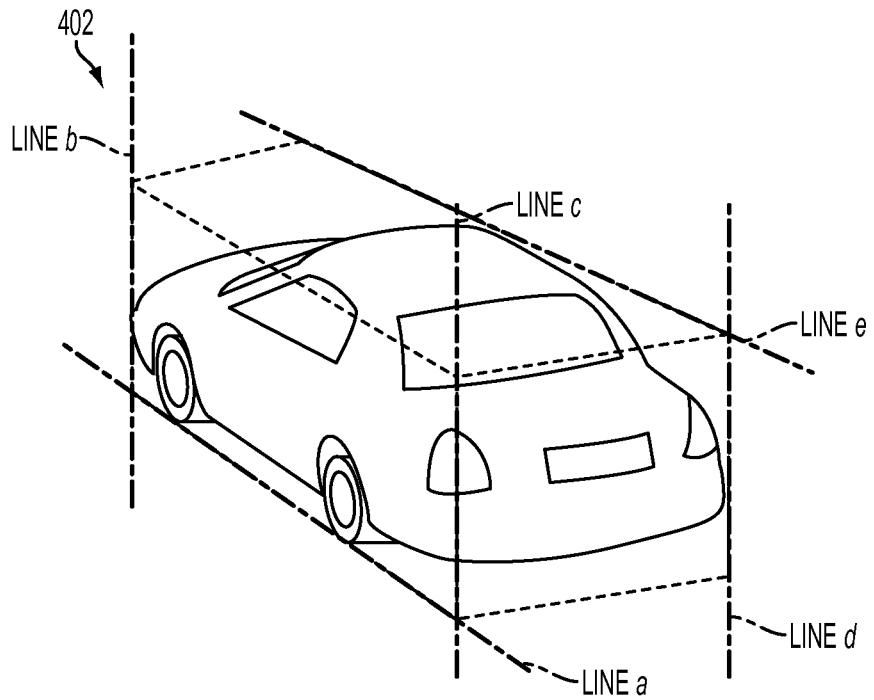

Line a may serve as a first border for the bounding box. Once the location of line a is estimated, the estimation system can further determine 106 two additional borders of the bounding box of the object. The two additional borders may be, for example, a first border along a vertical axis (such as left border line b as shown in FIG. 4) and a second border along the vertical axis that is opposite from and substantially parallel to the first border (such as right border line d as shown in FIG. 4). The left and right borders represented by lines b and d may also be determined 106 in each image using the image processing and estimation methods as described above.

Figure 5:
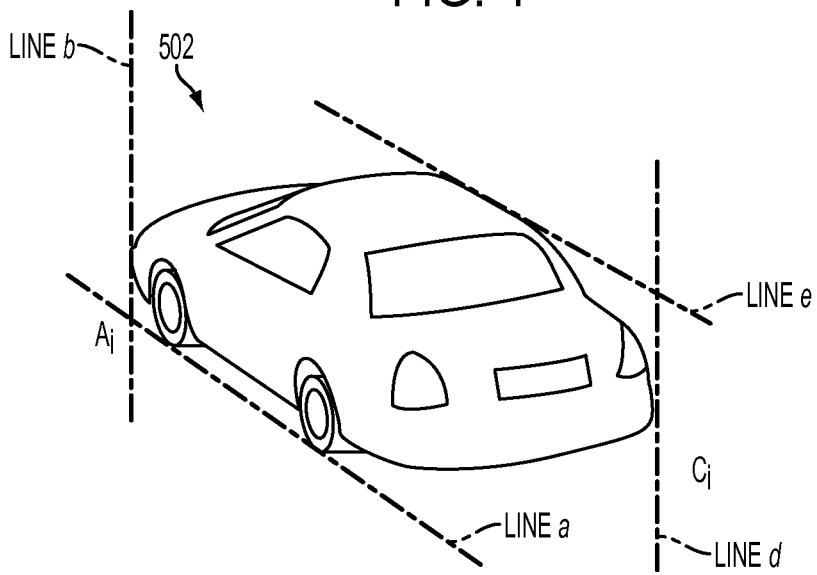

Based upon the determined borders of the bounding box for the vehicle, the estimation system may identify 108 a vertex of the bounding box and determine the world coordinates of the identified vertex of the bounding box. For example, as shown in image 502 of FIG. 5, the left front bottom vertex $A_i$ may be evaluated as the joint of lines a and b for each frame i. The world coordinates of $A_i$ may be calculated using equations (4) and (5) as listed above from its image coordinates, with the additional knowledge of z being zero (as line a has been estimated in image 502 of FIG. 5 at the point where the tires of the vehicle contact the support surface at a height of zero).

Returning to FIG. 1, based upon the image and world coordinates of the bottom vertex of the bounding box, the estimation system may estimate 110 the vehicle width and length as well as estimate 112 the vehicle height.

The estimation system may estimate 110 vehicle length L and width W using, for example, the information from multiple frames. The estimation system may denote $C_i$ as the non-adjacent bottom vertex to $A_i$ in the i-th frame (as shown in image 502 of FIG. 5, $C_i$ is the bottom right rear vertex of the vehicle bounding box). The world coordinate of point $C_i$ is $(x_i-L, y_i-W, 0)$, where $x_i$ and $y_i$ are the x and y coordinates of point $A_i$ may be estimated above in the determination of the bounding box vertices. Using equation (4) as listed above, the following relationship can be established:

$$(x_i-L)M(1,1)+(y_i-W)M(2,1)+M(4,1)-U_i(x_i-L)M(1,3)-U_i(y_i-W)M(2,3)-U_iM(4,3)=0 \quad (6)$$

where $U_i$ is the U-coordinate of line d in the i-th frame, (i=1, 2, ..., N). Equation (6) can be re-arranged as:

$$p_iL+q_iW=r_i \text{ for } (i=1,2,\ldots,N) \quad (7)$$

where $$pi_i=U_iM(1,3)-M(1,1) \quad (8)$$

$$q_i=U_iM(2,3)-M(2,1) \quad (9)$$

and $$r_i=U_i[x_iM(1,3)+y_iM(2,3)+M(4,3)]-[x_iM(1,1)+M(2,1)+M(4,1)] \quad (10)$$

The linear equation set (7) may have two unknowns L and W. However, equation (7) may be solved when N>1 using, for example, matrix inversion (when N=2) or least square methods (when N>2).

Additionally, the estimation system may estimate 112 the vehicle's height H. The top line e of the bounding box may be determined, for example, by a line detection algorithm for detecting a top surface of the vehicle. The y-coordinate of the line e may be calculated as $y_i-W$. The x and z coordinates of any points on the line e can be solved by applying equations (4) and (5) as listed above. The resulting z-coordinate may give the vehicle height.

The processes and techniques as described herein may be applicable to multiple real-world scenarios. For example, a parking structure may monitor the size of any available spaces. When a new vehicle enters the structure, the size of the vehicle may be quickly estimated and the driver of the vehicle may be instructed to proceed to a particular space that best fits their vehicle. More specifically, upon a vehicle entering the parking structure, a parking management system may estimate one or more dimensions of the vehicle and compare those dimensions against a listing of dimensions of available parking spaces. Based upon the comparison, the parking management system may determine a recommended spot for the vehicle and provide an indication to the driver of where the recommended spot is.

Figure 6:
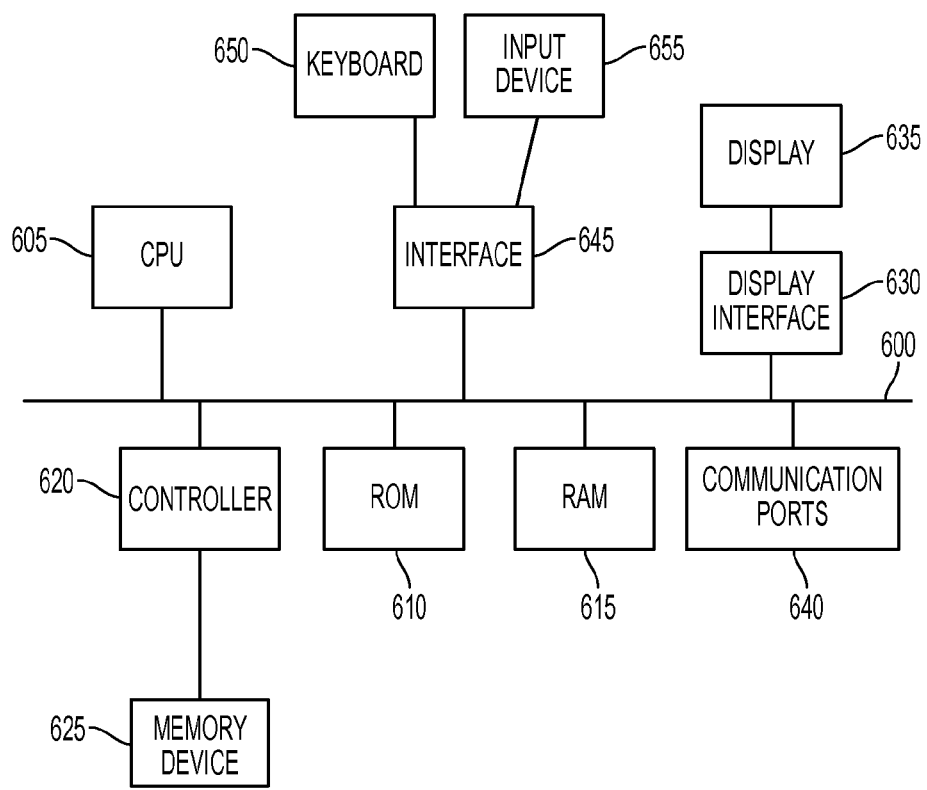
FIG. 6 depicts various embodiments of a computing device for implementing the various methods and processes described herein.

FIG. 6 depicts a block diagram of various hardware that may be used to contain or implement the various computer processes and systems as discussed above. An electrical bus 600 serves as the main information highway interconnecting the other illustrated components of the hardware. CPU 605 is the central processing unit of the system, representing a processor (which may be a single processing device or multiple processing devices) performing calculations and logic operations required to execute a program. CPU 605, alone or in conjunction with one or more of the other elements disclosed in FIG. 6, is a processing device, computing device or processor as such terms are used within this disclosure. Read only memory (ROM) 610 and random access memory (RAM) 615 constitute examples of memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 610 and/or the RAM 615. Optionally, the program instructions may be stored on a tangible and non-transitory computer readable medium such as a compact disk, a digital disk, flash memory, a memory card, a USB drive, an optical disc storage medium, a distributed storage solution such as a cloud based architecture, and/or other recording medium.

A display interface 630 may permit information to be displayed on the display 635 in audio, visual, graphic or alphanumeric format. Communication with external devices may occur using various communication ports 640. A communication port 640 may be attached to a communications network, such as the Internet or a local area network.

The hardware may also include an interface 645 which allows for receipt of data from input devices such as a keyboard 650 or other input device 655 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of determining one or more dimension estimations for a vehicle, the method comprising:
   receiving, by a processor, a sequence of image frames of a vehicle;
   extracting, by the processor, a digital representation of the vehicle from each image in the sequence of image frames;
   identifying a moving axis of the vehicle based on at least two image frames in the sequence;
   extracting two or more points where two or more tires of a side of the vehicle contact a supporting surface, wherein the extracting the two or more points comprises detecting an edge or subtracting a background of each image, and wherein the two or more points form a line that runs along the identified moving axis of the vehicle;
   determining, by the processor, a bounding box for the vehicle based at least partially upon the two or more extracted points for the digital representation of the vehicle;
   estimating, by the processor, at least one dimension for the vehicle based upon the determined bounding box; and
   outputting, by the processor, an indication of the at least one estimated dimension.

2. The method of claim 1, wherein outputting the indication comprises transferring the indication of the at least one estimated dimension as an input to a comparison technique for further processing the indication of the at least one estimated dimension.

3. The method of claim 2, wherein the comparison technique comprises a parking determination process configured to determine a recommended spot for the vehicle based upon the indication of the at least one estimated dimension.

4. The method of claim 1, wherein determining the bounding box further comprises identifying a line associated with the point where the vehicle contacts the supporting surface.

5. The method of claim 4, wherein identifying the line associated with the point where the vehicle contacts the supporting surface comprises:
   determining two or more points where each tire of a near side of the vehicle contacts the supporting surface; and
   drawing a line that includes a segment that extends between each of the points.

6. The method of claim 4, wherein determining the bounding box further comprises identifying a far right point of the digital representation of the vehicle and a far left point of the digital representation of the vehicle.

7. The method of claim 1, wherein estimating at least one dimension of the vehicle comprises estimating a length and width of the vehicle based upon a bottom edge of the boundary box.

8. The method of claim 7, wherein estimating at least one dimension of the vehicle comprises estimating a height of the vehicle based upon a distance measured between a rear vertex of the bounding box and an upper vertex of the bounding box.

9. The method of claim 1, wherein extracting the digital representation of the vehicle comprises at least one of example background subtraction, particle filtering, and a shadow removal algorithm.

10. A system for determining one or more dimension estimations for a vehicle, the system comprising:
    a processor configured to perform various functions and operations; and
    a non-transitory computer readable medium in communication with the processor, the computer readable medium comprising one or more programming instructions for causing the processor to:
    receive a sequence of image frames of a vehicle,
    extract a digital representation of the vehicle from each image in the sequence of image frames,
    identify a moving axis of the vehicle based on at least two image frames in the sequence,
    extract two or more points where two or more tires of a side of the vehicle contact a supporting surface, wherein the extracting the two or more points comprises detecting an edge or subtracting a background of each image, and wherein the two or more points form a line that runs along the identified moving axis of the vehicle,
    determine a bounding box for the vehicle based at least partially upon the two or more extracted points for the digital representation of the vehicle,
    estimate at least one dimension for the vehicle based upon the determined bounding box, and
    output an indication of the at least one estimated dimension.

11. The system of claim 10, wherein the one or more instructions for causing the processor to output the indication comprise one or more additional instructions for causing the processor to transfer the indication of the at least one estimated dimension as an input to a comparison technique for further processing the indication of the at least one estimated dimension.

12. The system, of claim 11, wherein the comparison technique comprises a parking determination process configured to determine a recommended spot for the vehicle based upon the indication of the at least one estimated dimension.

13. The system of claim 10, wherein the one or more instructions for causing the processor to determine the bounding box further comprise one or more additional instructions for causing the processor to identify a line associated with the point where the vehicle contacts the supporting surface.

14. The system of claim 13, wherein the one or more instructions for causing the processor to identify the line associated with the point where the vehicle contacts the supporting surface comprise one or more additional instructions for causing the processor to:
    determine two or more points where each tire of a near side of the vehicle contacts the supporting surface; and
    draw a line that includes a segment that extends between each of the points.

15. The system of claim 13, wherein the one or more instructions for causing the processor to determine the bounding box further comprise one or more additional instructions for causing the processor to identify a far right point of the digital representation of the vehicle and a far left point of the digital representation of the vehicle.

16. The system of claim 10, wherein the one or more instructions for causing the processor to estimate at least one dimension of the vehicle comprise one or more additional instructions for causing the processor to estimate length and width of the vehicle based upon a bottom edge of the boundary box.

17. The system of claim 16, wherein the one or more instructions for causing the processor to estimate at least one dimension of the vehicle comprise one or more additional instructions for causing the processor to estimate a height of the vehicle based upon a distance measured between a rear vertex of the bounding box and an upper vertex of the bounding box.

18. The system of claim 10, wherein the one or more instructions for causing the processor to extract the digital representation of the vehicle comprise one or more additional instructions for causing the processor to perform at least one of example background subtraction, particle filtering, and a shadow removal algorithm.

19. A method of determining one or more dimension estimations for a vehicle, the method comprising:
receiving, by a processor, a sequence of image frames of a vehicle;
extracting, by the processor, a plurality of digital representations of the vehicle from each image in the sequence of image frames, wherein each of the digital representations is associated with one image frame;
identifying a moving axis of the vehicle based on at least two image frames in the sequence;
determining, by the processor, a bounding box in each of the plurality of digital representations for the vehicle, wherein determining the bounding box comprises:
identifying a first line based at least partially upon extracting two or more points where two or more tires of a side of the vehicle contact a supporting surface, wherein the extracting of the two or more points comprises detecting an edge or subtracting a background of each image, wherein the first line runs along the identified moving axis of the vehicle,
identifying a second line based upon an identified far right point of the vehicle as determined from the extracted plurality of digital representations, wherein the second line is drawn perpendicular to the supporting surface and includes the far right point,
identifying a third line based upon an identified far left point of the vehicle as determined from the extracted plurality of digital representations, wherein the third line is drawn perpendicular to the supporting surface and includes the far left point, and
identifying a fourth line connecting the second line and the third line and draw essentially parallel to a top surface of the vehicle;
estimating, by the processor, at least one dimension for the vehicle based upon the determined bounding box; and
outputting, by the processor, an indication of the at least one estimated dimension.

20. The method of claim 19, wherein outputting the indication comprises transferring the indication of the at least one estimated dimension as an input to a comparison technique for further processing the indication of the at least one estimated dimension.

21. The method of claim 1, wherein extracting the two or more points comprises analyzing contrast ratios at areas where the two or more tires are most likely to be placed.

22. The system of claim 10, wherein the instructions for extracting the two or more points comprise additional instructions that will analyze contrast ratios at areas where the two or more tires are most likely to be placed.

23. The method of claim 19, wherein extracting the two or more points comprises analyzing contrast ratios at areas where the two or more tires are most likely to be placed.

24. The method of claim 3, wherein determining the recommended spot comprises comparing the indication of the at least one estimated dimension against a listing of dimensions of available parking spaces.

25. The system of claim 12, wherein the instructions for determining the recommended spot comprises additional instructions that will compare the indication of the at least one estimated dimension against a listing of dimensions of available parking spaces.

* * * * *